(12) United States Patent
Wildgrube

(10) Patent No.: US 9,938,872 B2
(45) Date of Patent: Apr. 10, 2018

(54) MUFFLER INSERT, AND SYSTEMS, METHODS AND APPARATUS FOR MAKING

(71) Applicant: Bay Fabrication Inc., Green Bay, WI (US)

(72) Inventor: Chris Jon Wildgrube, Green Bay, WI (US)

(73) Assignee: Bay Fabrication, Inc., Green Bay, WI (US)

(*) Notice: Subject to any disclaimer, the term of this patent is extended or adjusted under 35 U.S.C. 154(b) by 78 days.

(21) Appl. No.: 14/734,445

(22) Filed: Jun. 9, 2015

(65) Prior Publication Data

US 2016/0363018 A1    Dec. 15, 2016

(51) Int. Cl.
*B29C 70/30* (2006.01)
*F01N 1/08* (2006.01)
(Continued)

(52) U.S. Cl.
CPC ............ *F01N 1/082* (2013.01); *B29C 70/305* (2013.01); *B29C 70/382* (2013.01); *B29C 39/24* (2013.01);
(Continued)

(58) Field of Classification Search
CPC ..... B05B 7/149; B05B 7/1495; B29C 41/365; B29C 70/305
See application file for complete search history.

(56) References Cited

U.S. PATENT DOCUMENTS

| | | |
|---|---|---|
| 2,046,193 A | 6/1936 | Spicer |
| 3,074,802 A | 1/1963 | Alexander et al. |

(Continued)

FOREIGN PATENT DOCUMENTS

| | | |
|---|---|---|
| DE | 10002380 | 8/2001 |
| EP | 0446064 | 9/1991 |

(Continued)

OTHER PUBLICATIONS

Boydmay1, Royal Boats 169SS Gelcoating, fiberglass chopping, core materials, https://www.youtube.com/watch?v=FmdbCVq9K_A.*

(Continued)

*Primary Examiner* — Timothy L Maust
*Assistant Examiner* — Timothy P Kelly
(74) *Attorney, Agent, or Firm* — Thomas D. Wilhelm; Northwind IP Law, S.C.

(57) ABSTRACT

Sound-attenuating mufflers and muffler inserts, and systems and methods for fabricating such muffler inserts. Continuous fiberglass roving is fed to a pneumatic jet head which fluffs the roving and presents the fluffed roving to a delivery wand at the exit end of the jet head. A jet head/wand assembly is moved along a three-dimensional path such that the wand delivery tip travels along a predetermined three-dimensional path inside a mold thereby depositing the continuous, fluffed fiberglass strands in the mold along the predetermined path. A terminal end portion of a liquid resin conduit is mounted to the fiberglass-dispensing wand, as part of the delivery tip, and drip-feeds liquid resin onto the fiberglass as the fiberglass is being deposited in the mold. The undulating, up and down movement of the delivery tip produces a wave-like undulating pattern in the appearance of the rovings in the resulting molded product.

56 Claims, 11 Drawing Sheets

(51) Int. Cl.
  *B29C 70/38* (2006.01)
  *B29K 103/04* (2006.01)
  *B29L 31/30* (2006.01)
  *B29C 39/24* (2006.01)
  *B29C 70/16* (2006.01)
  *B29K 105/08* (2006.01)

(52) U.S. Cl.
  CPC .......... *B29C 70/16* (2013.01); *B29K 2103/04* (2013.01); *B29K 2105/08* (2013.01); *B29L 2031/30* (2013.01); *F01N 2310/02* (2013.01)

(56) References Cited

U.S. PATENT DOCUMENTS

| | | | |
|---|---|---|---|
| 3,107,403 A | 10/1963 | Moore | |
| 3,109,511 A | 11/1963 | Slayter et al. | |
| 3,121,268 A | 2/1964 | Rubens | |
| 3,340,115 A | 9/1967 | Rubenstein | |
| 3,393,109 A * | 7/1968 | Dorst | B29C 70/12 156/279 |
| 3,425,982 A | 2/1969 | Fink | |
| 3,449,188 A | 6/1969 | Huff | |
| 3,489,626 A | 1/1970 | Rubenstein | |
| 3,502,529 A | 3/1970 | Borgnolo et al. | |
| 3,520,749 A | 7/1970 | Rubenstein | |
| 3,532,132 A | 10/1970 | Rubenstein | |
| 3,590,111 A | 6/1971 | Gebefugi | |
| 3,613,830 A | 10/1971 | Hubbell, III | |
| 3,619,322 A | 11/1971 | Fleissner | |
| 3,669,638 A | 6/1972 | Wong et al. | |
| 3,740,284 A | 6/1973 | Dillon | |
| 3,813,371 A | 5/1974 | Bozer et al. | |
| 3,957,410 A | 5/1976 | Goldsworthy et al. | |
| 3,980,484 A | 9/1976 | Shaw | |
| 4,324,314 A | 4/1982 | Beach et al. | |
| 4,513,841 A | 4/1985 | Shimoji et al. | |
| 4,569,471 A | 2/1986 | Ingemansson et al. | |
| 4,685,873 A | 8/1987 | Willard et al. | |
| 4,774,985 A | 10/1988 | Broadbelt et al. | |
| 4,788,230 A | 11/1988 | Mudge | |
| 4,824,507 A | 4/1989 | D'Amico | |
| 4,846,302 A | 7/1989 | Hetherington | |
| 4,898,770 A | 2/1990 | Dunbar | |
| 4,930,597 A | 6/1990 | Udell | |
| 4,952,366 A | 8/1990 | Gelin | |
| 5,009,941 A | 4/1991 | Pollet et al. | |
| 5,036,585 A | 8/1991 | Schweinfurth | |
| 5,041,260 A | 8/1991 | Johnson et al. | |
| 5,092,122 A | 3/1992 | Bainbridge | |
| 5,109,950 A | 5/1992 | Lescher | |
| 5,162,622 A | 11/1992 | Malmsten | |
| 5,264,170 A | 11/1993 | Strachan | |
| 5,338,169 A | 8/1994 | Buckley | |
| 5,407,631 A | 4/1995 | Salisbury | |
| 5,418,339 A | 5/1995 | Bowen et al. | |
| 5,461,777 A | 10/1995 | Ikeda et al. | |
| 5,479,706 A | 1/1996 | Tamano et al. | |
| 5,545,279 A | 8/1996 | Hall et al. | |
| 5,670,756 A | 9/1997 | Ohtaka et al. | |
| 5,705,777 A | 1/1998 | Flanigan et al. | |
| 5,718,045 A | 2/1998 | Tsukahara et al. | |
| 5,766,541 A | 6/1998 | Knutsson et al. | |
| 5,976,453 A | 11/1999 | Nilsson et al. | |
| 6,053,276 A | 4/2000 | D'Amico, Jr. et al. | |
| 6,138,791 A | 10/2000 | Zanzie | |
| 6,241,043 B1 | 6/2001 | Goertz | |
| 6,319,444 B1 | 11/2001 | Kirk | |
| 6,344,160 B1 | 2/2002 | Holtzberg | |
| 6,607,052 B2 | 8/2003 | Brandt et al. | |
| 6,883,558 B2 * | 4/2005 | Jander | F01N 1/10 141/1 |
| 7,661,247 B2 | 2/2010 | Schwabel et al. | |
| 7,730,996 B2 | 6/2010 | Van De Flier et al. | |
| 7,934,580 B2 | 5/2011 | Van De Flier et al. | |
| 7,942,237 B2 | 5/2011 | Van De Flier et al. | |
| 2001/0011780 A1 | 8/2001 | Knutsson | |
| 2002/0079161 A1 | 6/2002 | Curtice et al. | |
| 2002/0175447 A1 | 11/2002 | Bellasalma | |
| 2004/0137175 A1 | 7/2004 | Dillon et al. | |
| 2005/0279570 A1 | 12/2005 | Van Arndale | |
| 2006/0045967 A1 * | 3/2006 | Manka | C03C 17/28 427/180 |
| 2007/0240932 A1 | 10/2007 | Van De Flier et al. | |
| 2008/0142295 A1 | 6/2008 | Huff | |
| 2008/0290547 A1 | 11/2008 | Kashikar et al. | |
| 2009/0014236 A1 | 1/2009 | Van De Flier et al. | |

FOREIGN PATENT DOCUMENTS

| | | |
|---|---|---|
| EP | 0931971 | 7/1999 |
| EP | 1338769 | 8/2003 |
| GB | 2158001 | 11/1985 |
| JP | 2008073875 | 4/2008 |

OTHER PUBLICATIONS

Ira Greiff, MVP Chopper Gun & Gelcoat Application Techniques. wmv, https://www.youtube.com/watch?v=P7UmB1_rsxo.*

* cited by examiner

MUFFLER INSERT, AND SYSTEMS, METHODS AND APPARATUS FOR MAKING

BACKGROUND

This invention pertains to mufflers. In general, a muffler has an outer shell, generally steel, which encloses a medium which absorbs and/or otherwise attenuates the sound emitted by e.g. an internal combustion engine. An inlet pipe feeds exhaust gases from the engine into the muffler. An exit pipe carries the exhaust gases away from the muffler.

The medium inside the muffler can be as minimal as the air which is inherently contained inside the muffler shell. Namely, the exhaust gases and/or shock waves pass/expand from the inlet pipe into the bulk of the shell cavity, and then pass from there into the exit pipe.

In other embodiments, the medium includes a multiple-pass path of pipes and/or baffles inside the muffler shell, where such multiple-pass path carries the exhaust gases through an elongate journey through the muffler, and where the length of the path, in combination with the internal pipe configuration, and other acoustic design properties, collectively contribute to sound attenuation inside the muffler.

More commonly, the muffler shell is packed with a fibrous packing material such as fiberglass which may be separately fabricated as an "insert". The exhaust gases, and/or the shock waves in the exhaust gases, are allowed and/or directed to flow into and/or through the fibrous packing material whereby the fibrous material absorbs/attenuates a portion of the sound.

This invention pertains, specifically, not only to mufflers in general, but also to muffler inserts, and methods and apparatus for fabricating muffler inserts.

In general, the process of reducing the intensity of the sound emitted by an engine, in a fiberglass-packed muffler, relates to the ability to disburse the sound waves into the medium materials so the medium can absorb and disburse the energy of the sound waves. While fiberglass is typically used as the fibrous packing material medium, other high temperature materials can be used in place of the fiberglass.

The muffler shell, which is packed with fiberglass, may also be known as a canister. The inlet pipe, leading into the muffler, carries the exhaust gases from the engine into the muffler. The exit pipe, leaving the muffler, receives the exhaust gases after such gases have passed through the sound-attenuating portion of the muffler, and passes those exhaust gases to downstream portions of the exhaust system or to ambient air. The exit pipe leaving the muffler may be an extension of the inlet pipe which carries the exhaust gases into the muffler. In the alternative, the exhaust gases may traverse one or more additional pipes inside the muffler whereby there may or may not be additional exhaust-gas carrying pipes and/or baffles inside the muffler shell, depending on the specifications of the particular muffler; and the exit pipe may not be the same pipe as the inlet pipe.

Some or all of the space inside the muffler shell, which is not occupied by the inlet pipe, the exit pipe, or any other internal structure inside the canister, is desirably occupied by uniformly packed fiberglass, which fiberglass provides a substantial portion of the sound attenuation properties of the muffler.

While some mufflers have a plurality of internal metal baffles and/or pipes which direct the exhaust gases in a tortuous path, other mufflers, as is the case in the embodiments illustrated, attenuate the sound in the exhaust gases as the pipe carrying the exhaust gases makes a straight-line pass through the muffler. The primary means for attenuating the sound in a straight-through muffler, such as in the embodiments illustrated herein, is to surround the inlet pipe, and/or another pipe inside the muffler, with a pack/insert of fiberglass or other fibrous material. The fiberglass pack/insert is surrounded by the outer shell such that the fiberglass pack/insert is held between the outer shell of the muffler and an exhaust-gas-carrying tube.

In some instances, the fiberglass insert is packaged in a plastic bag such that the plastic layer generally protects a worker's hands from the harsh affects of the fiberglass on human skin. When a muffler containing such insert is incorporated into an engine exhaust system, and the engine is activated, the heat from the exhaust gases melts and burns off the plastic bag, and at about 600 degrees F. sustained temperature, the gases also burn off any e.g. phenolic resin/binder in the fiberglass pack, leaving only the fiberglass as the "pack" inside the muffler. Once the fiberglass is released from any such binder as the binder and plastic film are burned off, the fiberglass, in general, expands to fill the space into which the insert was inserted, namely the volumetric, three-dimensional space being occupied by the insert inside the muffler.

Restated, as a fiberglass pack/insert is fabricated, certain transverse stresses are imposed on the individual strands of fiberglass. Those transverse stresses are at least in part maintained in the insert by the combination of any cured resin and any surrounding plastic bag. Once the bag and binder are burned off inside the muffler, any residual transverse stresses on the strands cause the strands to move in transverse restoration directions until otherwise restrained by other strands, or by the muffler shell or pipes, or until the residual stresses are sufficiently attenuated that the fibers no longer experience a net directional force. Thus, when any binder and any plastic film are burned off, the fiberglass pack, as a whole, expands to a less-stressed condition, and correspondingly better fills the available space inside the muffler shell.

The efficiency with which a muffler attenuates sound depends in part on the uniformity of the density and uniformity of distribution of the fiberglass in the fiberglass pack at steady state operation of the muffler. Uniformity of fiberglass density and distribution also influences uniformity of temperature distribution inside the muffler as well as temperature at the muffler shell, thus effecting thermal stress distribution in the muffler, which influences use life of the muffler.

The extent to which the expanded fiberglass density and distribution are uniform throughout the available space inside the muffler shell depends in part on the ability of the insert to conform to the available space, and in part on the uniformity of the density and distribution of the fiberglass in the insert as the insert is being assembled into the muffler shell.

The problem addressed by the invention is that of creating a reproducible fiberglass insert which resides between an exhaust-gas-carrying tube and the outer muffler shell, starting with continuous fiberglass rovings as the raw material from which the insert is made and which provides desirably uniform density and distribution of the fiberglass during steady-state operation of the muffler, while providing suitable safety to workers who install such inserts in the process of assembling mufflers.

Some known processes by which fiberglass-based products are made and/or filled into muffler shells result in uneven distribution of the fiberglass inside the muffler shell, or distribution which is not reliably repeatable, such that, when the binder and/or plastic burn off, the fiberglass density is not reliably evenly distributed in the occupied space, which results in hot spots in the muffler, or there is variation from muffler to muffler, or from one production run to a subsequent production run.

Other known processes by which fiberglass-based products are made and/or filled into muffler shells include use of powdered binder, which is accompanied by air quality issues in the workplace where such products are made.

Thus it is desirable to provide systems, apparatus, and methods of uniformly distributing fiberglass and a binder in a muffler insert.

More specifically, it is desirable to provide systems, apparatus, and methods for uniformly distributing such fiberglass while including such binder in a mold which receives the fiberglass and binder and which provides a shape-constant core for the insert.

It is also desirable to provide systems, apparatus, and methods by which uniformity of density and distribution of such fiberglass-binder core is reliably reproducible over an extended period of time without air quality issues related to a powdered binder.

It is further desirable to provide systems, apparatus, and methods for fabricating such muffler insert article, and muffler into which the insert article has been assembled, wherein the quality of the insert product is reliably reproducible.

It is yet further desirable to provide systems and apparatus adapted to fabricate a fiberglass-based muffler insert and wherein the insert fabricated using such systems and apparatus defines a generally uniform distribution of fiberglass throughout the volume defined by such insert, and wherein the insert is reliably reproducible.

It is further desirable to provide a method of fabricating such muffler insert article, which method includes using a jet head to fluff a continuous fiberglass roving and to move a wand extension of the exit end of the jet head about, inside the mold, positively placing the fiberglass-based material in such mold at staged multiple elevations inside the mold.

It is still further desirable to place a binder, in non-powder form, in the mold simultaneously with the placement of the fiberglass in the mold.

It is still further desirable to mount a binder dispenser exit locus in close proximity to the exit end of the nozzle of the fiberglass dispenser such that the binder is placed in close proximity to the fiberglass being concurrently placed in the mold.

It is yet further desirable to provide an industrial-level computer which guides specific placement of such fiberglass and binder in the mold along a predetermined 3-dimensional path.

It is also desirable to design the predetermined three-dimensional path according to the volumetric profile of the mold cavity into which such fiberglass and binder are to be placed.

SUMMARY

This invention provides sound-attenuating mufflers and muffler inserts, and systems and methods for fabricating such muffler inserts.

In the invention, one or more continuous fiberglass rovings is fed to a pneumatic nozzle/jet head which fluffs the rovings and presents the fluffed rovings to a delivery wand at the exit end of the jet head. A delivery system drive drives the jet head/wand assembly along a three-dimensional path such that the wand delivery tip travels along a predetermined three-dimensional path inside a mold thereby depositing the continuous, fluffed fiberglass strands in the mold along the predetermined, and therefore predictable, path. A liquid-adhesive resin dispenser is mounted to the fiberglass-dispensing wand, as part of the delivery tip, and drip-feeds liquid-adhesive resin onto the fiberglass as the fiberglass strands are being deposited/placed in the mold. The undulating, up and down movement of the delivery tip produces a wave-like undulating pattern in the appearance of the rovings in the resulting molded product.

In a first family of embodiments, the invention comprehends a molded fiberglass-based sound attenuating muffler insert core comprising a generally shape-constant cured mixture of continuous fiberglass roving and cured liquid resin binder, the insert core having an outer surface configured to interface with an inside surface of a muffler shell into which the insert core is adapted to be assembled so as to provide fiberglass-based sound attenuation in a muffler when the muffler is fully assembled, whereby the muffler insert core is adapted to maintaining a relatively constant shape configured to interface with the inside surface of the muffler shell, and wherein the continuous fiberglass roving has been fluffed so as to reduce the density of the roving, and wherein the fluffed roving, in elevation view of the insert core, exhibits a conspicuously wave-like, undulating pattern.

In some embodiments portions of the fluffed roving deviate from the wave-like undulating pattern.

In some embodiments, portions of the fluffed roving randomly deviate from the wave-like undulating pattern.

In some embodiments, portions of the fluffed roving exhibit generally isolated circular patterns.

In some embodiments, the insert core has been fabricated by inserting an exit wand tip of a jet head into an insert core mold, and moving the exit wand tip along an up and down zigzag path while delivering the fluffed fiberglass roving into the mold.

In some embodiments, the invention comprehends a muffler insert made with a such insert core, and a polymeric film shrunk about the muffler insert core.

In some embodiments, the invention comprehends a muffler made with a such muffler insert.

In a second family of embodiments, the invention comprehends a method of charging a cavity in a mold with a combination of a fiberglass and a binder, the method comprising conveying a fiberglass roving from a source to a jet head; fluffing the fiberglass roving in the jet head and urging the fluffed fiberglass roving out an exit end of the jet-head, to a delivery tip; conveying a curable liquid resin from a resin source to the delivery tip; and inserting the delivery tip into a mold cavity and, in the mold cavity, moving the delivery tip in a combination of up and down and transverse motions along a delivery path, and simultaneously dispensing both fluffed fiberglass roving and liquid binder into the mold, thereby charging the fluffed fiberglass roving and the liquid resin into the mold cavity.

In some embodiments, the method further comprises dispensing the liquid resin binder drop-wise onto the fluffed fiberglass roving as the fiberglass roving is being dispensed into the mold.

In some embodiments, the method further comprises moving the delivery tip along a zigzag up and down path wherein the delivery tip moves in a diagonal direction which simultaneously includes both a vertical vector and a horizontal vector.

In some embodiments, the method further comprises, initially in a first stage of charging the mold cavity, confining movement of the delivery tip to a lower first portion of the mold cavity.

In some embodiments, the method further comprises, in a subsequent second stage of charging the cavity, confining movement of the delivery tip to a relatively upper second portion of the mold above the first portion of the mold.

In some embodiments, the invention comprehends a muffler insert, comprising a muffler insert core made according to the methods of the invention, and a polymeric film shrunk about the muffler insert core.

In some embodiments, the invention comprehends a muffler, comprising a muffler outer shell, and a muffler insert made according to the methods of the invention.

In a third family of embodiments, the invention comprehends a system for charging continuous fiberglass and liquid resin into a mold in the process of fabricating a muffler insert core, the system comprising a continuous fiberglass source, supplying a continuous fiberglass roving; a fiberglass feed mechanism adapted to feed the fiberglass roving from the fiberglass source; a resin source, supplying a liquid resin through a resin conduit; a resin feed mechanism adapted to feed the liquid resin from the resin source, through a resin conduit; a delivery system assembly comprising a jet head having an entrance and an exit, receiving the fiberglass roving from the fiberglass source, an exit wand, and a delivery tip wherein an exit end of the exit wand and an exit end of the resin conduit are held together so as to deliver supplies of the fiberglass roving and the resin at a generally common location; a drive system adapted to drive the delivery tip along a three-dimensional path inside the mold for the muffler insert core; and a programmable controller adapted to control delivery of the fiberglass roving and the resin into the mold.

In some embodiments, the programmable controller controls the path traversed by the delivery tip in the mold.

In some embodiments, the programmable controller controls timing during which fiberglass and resin are delivered into the mold.

In some embodiments, the fiberglass feed mechanism comprises a traction feed device having at least first and second feed wheels, and wherein the fiberglass roving encounters at least one of the feed wheels at least two times.

In some embodiments, the resin feed mechanism comprises a flow control valve.

In some embodiments, the resin source comprises a pressure reservoir.

In some embodiments, the resin feed mechanism comprises at least one of a servo motor or a stepper motor, to assist in controlling quantity of resin fed to the mold.

In some embodiments, the exit wand has an outer diameter of about 0.4 inch to about 0.75 inch, optionally about 0.5 inch, and an inner diameter of about 0.32 inch to about 0.65 inch, optionally about 0.42 inch.

In some embodiments, the resin conduit is held to the jet head wand proximate the delivery tip by a resiliently expansible sleeve.

In some embodiments, the programmable controller provides activation and/or deactivation signals directed toward at least the traction feed device, and the delivery system assembly drive which controls the path of the delivery tip in the mold.

In some embodiments, the programmable controller controls positioning of the mold below the delivery tip.

In some embodiments, the invention comprehends a muffler insert, comprising a muffler insert core made using a system of the invention; and a polymeric film shrunk about such muffler insert core.

In some embodiments, the invention comprehends a muffler, comprising a muffler outer shell; and a muffler insert, made using a system of the invention, inside the muffler outer shell.

Figure 1:
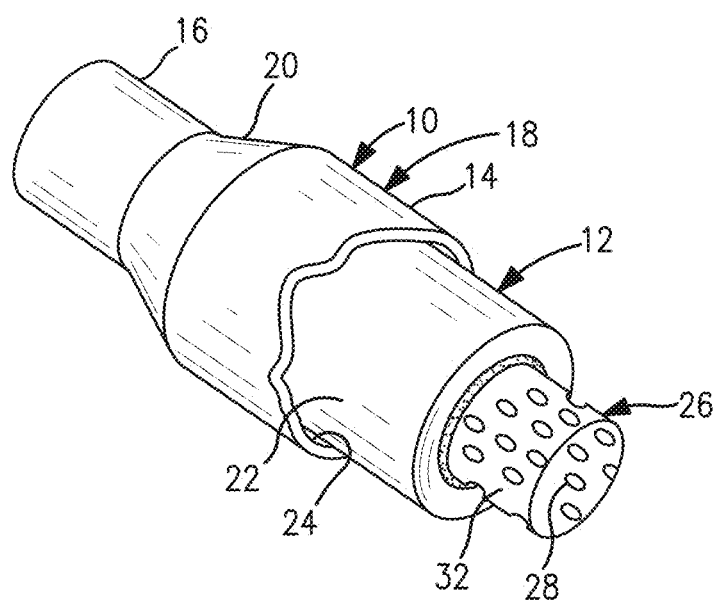
FIG. 1 is a pictorial view of a prior art straight-through-flow muffler which includes a muffler insert.

The invention is not limited in its application to the details of construction, or in the arrangement of the components, or in the specific methods set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 2:
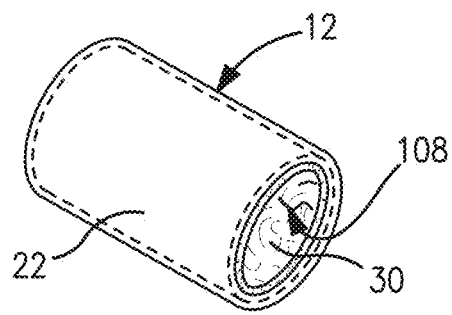
FIG. 2 is a pictorial view of a muffler insert, including an insert core, and a plastic film surrounding the outer diameter of the core.

FIG. 1 shows a cut-away illustration of a typical straight-flow-through muffler, generally designated as 10. In muffler 10, a cylindrical insert 12, shown generally in FIG. 2, is assembled into a muffler shell 14, thus forming the desired muffler 10 having a contained shrink-wrapped, fiberglass-based insert. Muffler shell 14 includes a lead-in section (not shown), an exit section 16, a relatively enlarged muffling section 18, a lead-in transition section (not shown) between the muffling section and the lead-in section, and an exit transition section 20 between the muffling section and the exit section. In some instances, the portions of the muffler shell represented by the lead-in section and the lead-in transition section are not assembled to the remaining portions of the muffler shell until after the insert has been assembled into the muffling section. FIG. 1 thus shows the exit section of the muffler shell, as well as the exit transition section and a portion of the muffling section. The lead-in section and the lead-in transition section are typically mirror images of the exit section and the exit transition section, respectively.

The outer circumference 22 of the finished, shrink-wrapped, insert 12 generally conforms to the inner surface 24 of the muffling section of the muffler shell whereby the insert can be inserted into the muffling section by sliding the insert longitudinally into the muffling section.

In the embodiment illustrated in FIG. 1, exhaust inlet pipe 26 extends straight through the inlet section, through the inlet transition section, and through the muffling section of the shell. Inlet pipe 26 has apertures 28 which allow exhaust gases to exit the exhaust pipe and mingle with the fiberglass in insert 12, as well as allowing the shock waves in the exhaust gases to exit pipe 26 through apertures 28 which, in combination, results in the muffler providing a substantial sound-reducing affect.

Inlet pipe 26 can be assembled to the shell after the insert has been assembled to the shell. In such instance, the inlet pipe is inserted longitudinally into the insert aperture 30 which faces toward the reader in FIG. 2. As the inlet pipe is inserted into aperture 30, the leading edge of pipe 26 engages any portion of the shrink film which extends into aperture 30, and pushes that film inwardly into the aperture. As the film is pushed into the aperture, the film stretches and moves toward the inner surface of the aperture, such that a portion of the film may lie between the inner surface of the aperture and the outer surface 32 of pipe 26.

In the alternative, inlet pipe 26 can be first assembled to the lead-in section and lead-in transition sections of the muffler shell. The so-assembled combination can then be assembled to the remaining portions of the muffler after the insert is assembled into the shell, including sliding the inlet pipe longitudinally into the aperture of the insert as discussed above. Any remaining joints in the muffler are then closed, thereby providing final closure of the closed muffler product.

Figure 3:
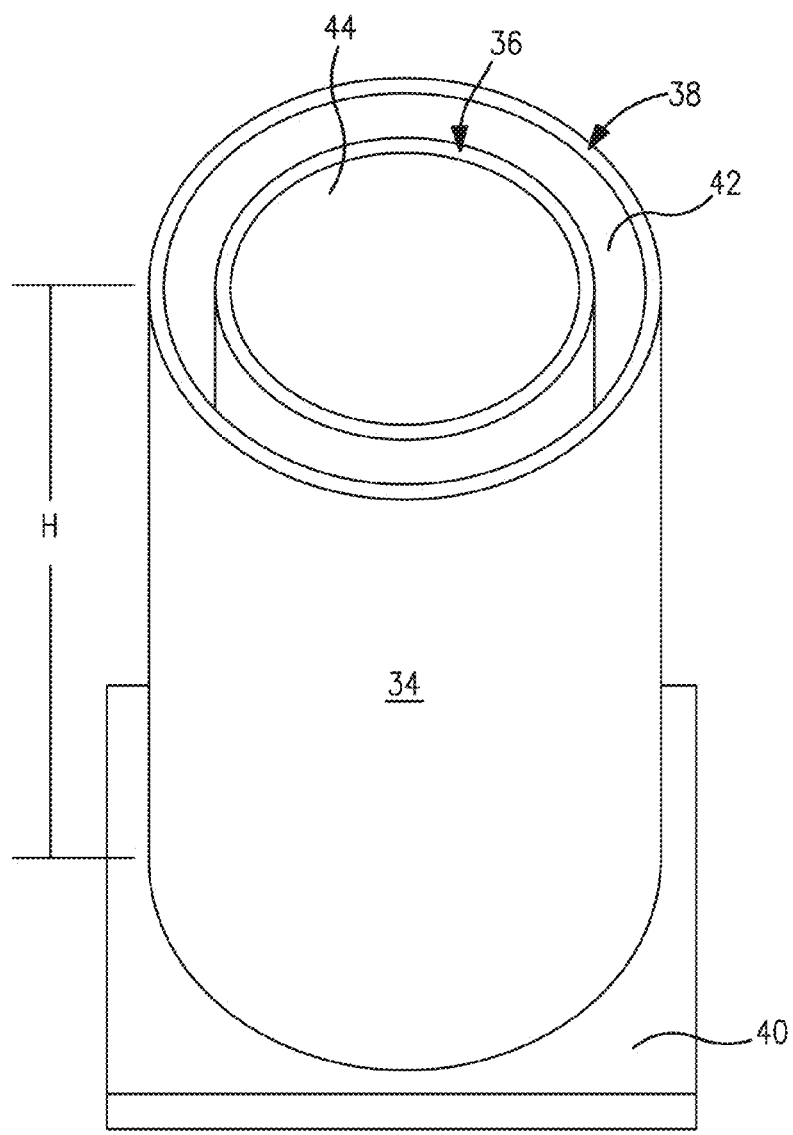
FIG. 3 shows a pictorial top view of an exemplary circular-cylindrical mold for a muffler insert core.

An illustrative cylindrical mold 34 which can be used with prior art methods of making inserts is shown in FIG. 3. Such mold 34 has a top, a bottom, and a height "H" between the top and the bottom. An inner cylinder wall 36 of the mold is concentric with an outer cylinder wall 38. Both cylinder walls 36, 38 are mounted to base plate 40 which extends across the bottom of the mold and thus closes off the bottom of the mold. A cylindrical fiber-receiving cavity 42 extends from the bottom of the mold to the top of the mold, between cylinder walls 36 and 38. A central cavity 44, which does not receive fiber, is enclosed by inner cylinder wall 36.

Figure 4:
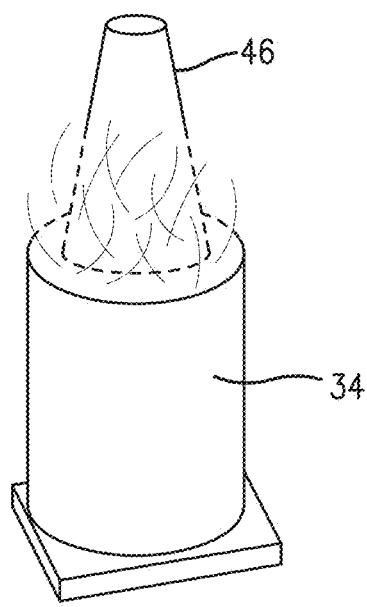
FIG. 4 is a pictorial view showing a mold, bearing a prior art mold plug, after the mold has received a charge of a mixture of chopped fiberglass and powdered binder.
Figure 5:
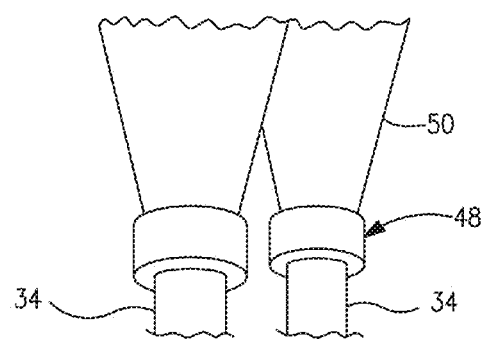
FIG. 5 is a side elevation view showing a portion of a prior art process wherein a funnel was used to guide a mixture of powdered binder and chopped fiberglass into an underlying mold such as the mold of FIG. 3.

In order to prevent fiber from entering cavity 44 in such prior art process, a cone-shaped plug 46, as illustrated in FIG. 4, is placed over cavity 44. An adapter 48, shown in FIG. 5, is then placed over the mold, leaving open the top of fiber-receiving cavity 42. A funnel 50 is mounted to the top of the adapter, and a charge of a fiberglass-binder mixture is dropped through the funnel into mold cavity 30. Multiple charges of the mixture are dropped into the mold, with the mixture in the mold being tamped between such chargings.

Figure 6:
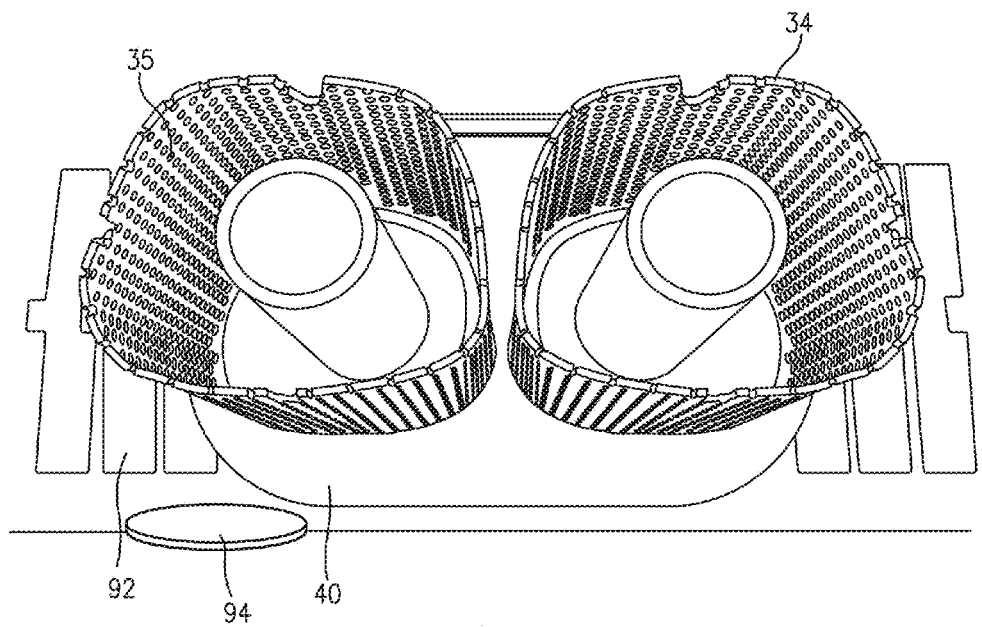
FIG. 6 shows a top pictorial view of first and second molds useful in the invention for making muffler cores.

Turning now to the invention, FIG. 6 shows top view of first and second molds 34 mounted to a common base plate 40. The molds 34 differ from the mold illustrated in e.g. FIG. 3 in that the radial dimension of the mold cavity varies about the perimeter of the mold, and a plurality of steam release ports 35 extend through the sides of the mold for exhausting flowing air which enters the mold as well as through base plate 40 at the bottoms of the mold cavities. Accordingly, a process such as the prior art process referred to above, which fills the mold cavity with a fiber-binder mixture by "dropping" a charge of the mixture into the mold cavity, runs the risk that the insert will have a relatively lower fiber density where the radial dimension of the cavity is relatively larger, and a relatively greater fiber density where the radial dimension of the cavity is relatively smaller.

Figure 7:
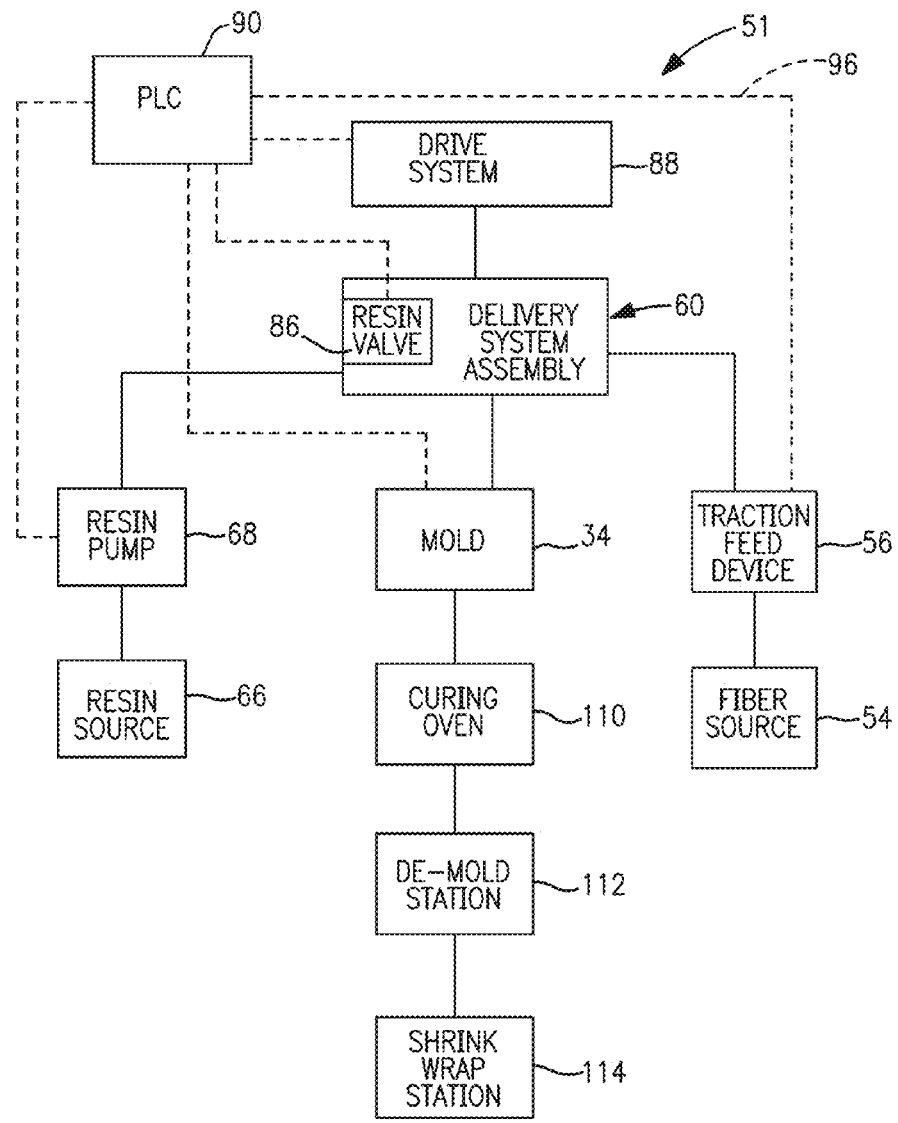
FIG. 7 shows a flow chart of a process of the invention.
Figure 9:
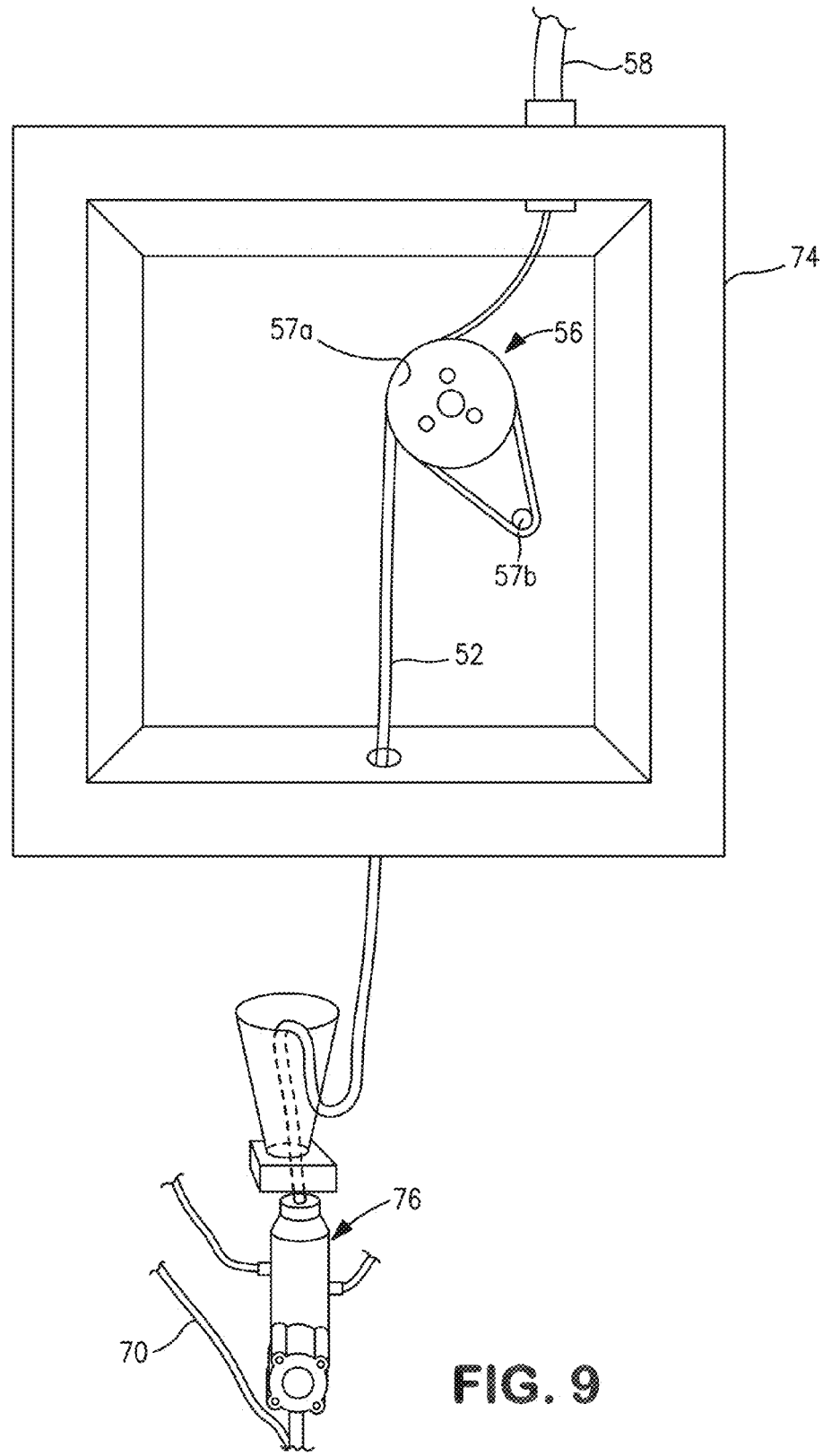
FIG. 9 is a side elevation view of the traction feed device and the entrance end of the fluffing nozzle.
Figure 10:
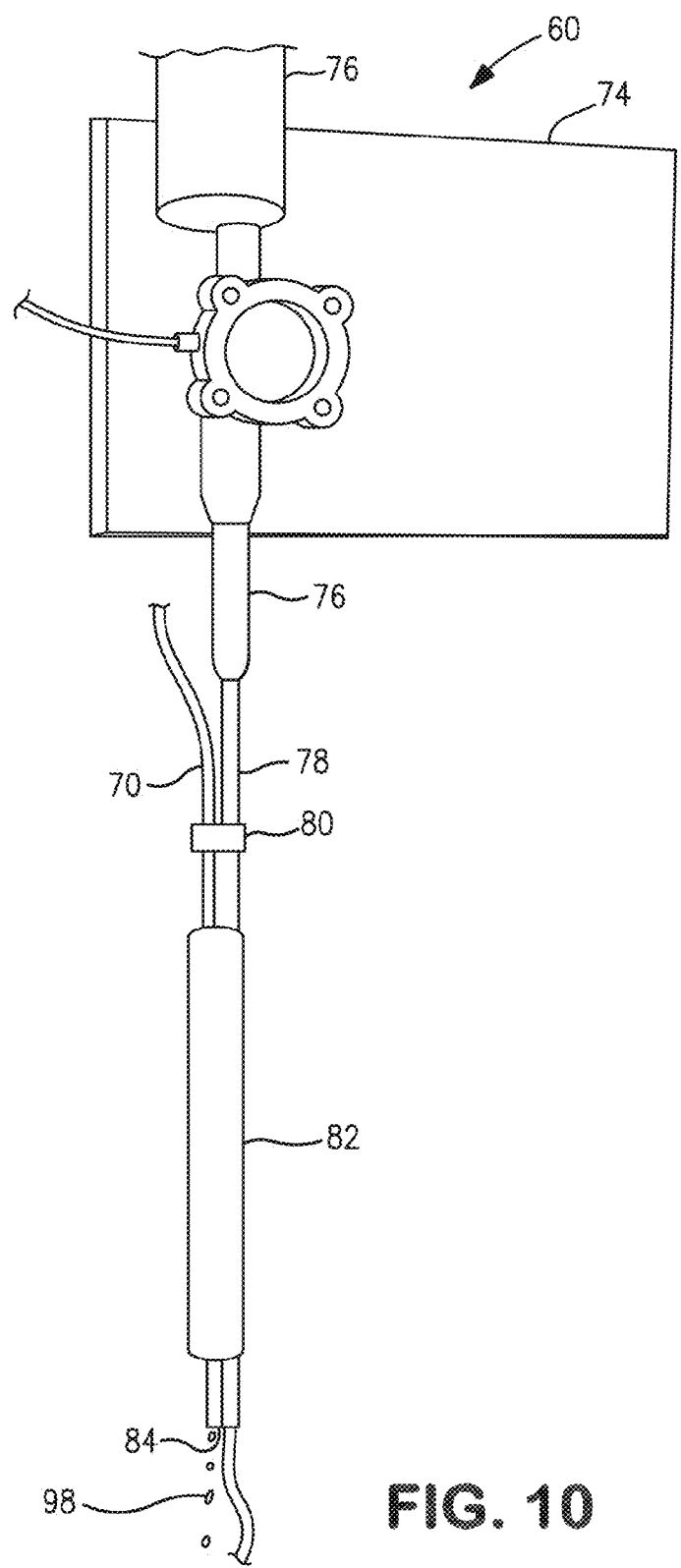
FIG. 10 is a side elevation view of a lower portion of the fluffing jet head, including a wand, and a resin-dispensing conduit.

FIG. 7 shows the mold-filling system 51 and process of the invention diagrammatically. Fiberglass roving 52 is drawn from a fiberglass source, such as one or more spools of roving 54 (FIG. 8) by a traction feed device 56. Traction feed device 56 draws the fiberglass roving through a conduit 58 and delivers the roving to a delivery system assembly 60. FIGS. 9 and 10 show elements of the delivery system assembly.

Figure 8:
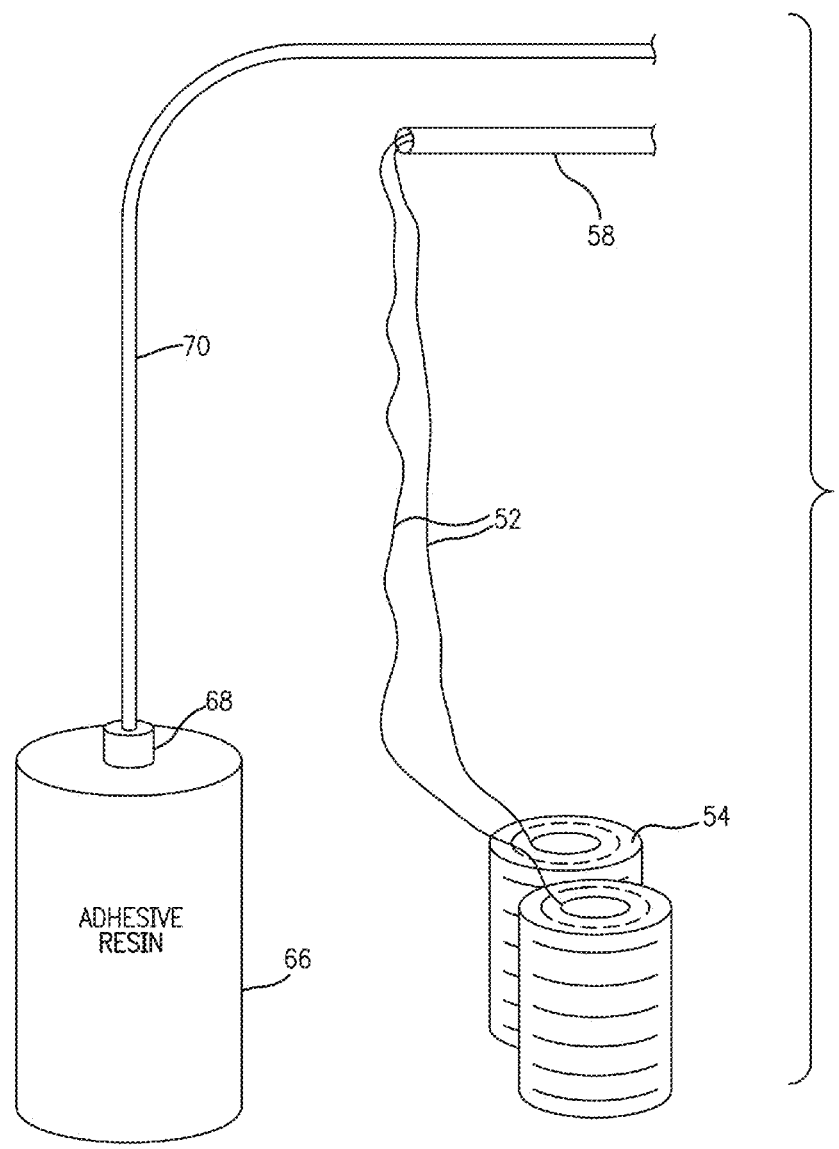
FIG. 8 shows a representative pictorial view of an adhesive container which supplies adhesive to the process of the invention, and two spools of fiberglass rovings/rope which feed continuous strand bundles of fiberglass roving to a feed pipe which leads to a pneumatic texturizing jet head, which jet head fluffs the fiberglass rope and positions the fluffed fiberglass into a mold such as those illustrated in FIG. 6.

Also as illustrated in FIGS. 7 and 8, liquid adhesive resin is drawn from a resin source/reservoir 66 by an adhesive resin pump 68; or in the alternative the resin reservoir can be pressurized. The adhesive pump, or pressure from the resin reservoir, delivers the liquid adhesive resin, through an adhesive conduit 70, to delivery system assembly 60, alongside the fiberglass rovings which arrive through conduit 58. At least the terminal portion of resin conduit 70, proximate delivery system assembly 60, is flexible such that the conduit can tolerate substantial movement of the terminal portion of the conduit, of at least about 6-10 inches, in any direction from a home position.

A suitable adhesive resin is a single stage phenolic resin in water, available from Plastics Engineering Company, Sheboygan, Wis. as Plenco 15100 phenolic resin.

Delivery system assembly 60 includes a mounting housing 74, a pneumatic jet head 76 mounted to the mounting housing, and a wand 78 extending from the exit end of the jet head. In the illustrated embodiment, the terminal portion of resin conduit 70 is mounted to wand 78 by a localized clamping device 80 such as a zip tie. Conduit 70 extends from localized clamping device 80 alongside wand 78 and is held in general contact with wand 78 by a radially resiliently expansible sleeve 82. The collective effect of clamping device 80 and sleeve 82 is to hold the terminal end portion of the resin conduit generally fixedly attached to, and extending longitudinally alongside, the wand, and wherein the terminal exit end of the resin conduit is proximate the terminal exit end of the wand and, in combination, provides a fiber-resin delivery tip 84. The terminal exit ends of wand 78 and conduit 70 terminate at approximately a common height at the delivery tip.

An optional resin valve 86 may be located anywhere between pump 68 and the exit end of conduit 70. Resin pump 68 may be a positive displacement pump which can be calibrated to deliver the resin at a desired rate. Resin valve 86 is a second element which further facilitates controlling the flow of resin and the rate of flow of resin through the resin conduit. Where the resin reservoir 66 is pressurized, valve 86 can be located anywhere along the length of conduit 70, optionally proximate the exit end of conduit 70.

In the invention, delivery system assembly 60 overlies a mold 34 and moves relative to the underlying mold, thus to insert delivery tip 84 into the mold, to move the delivery tip about in the mold along a predetermined, and therefore predictable, path. Such movement of the delivery system assembly, and thus the path along which the delivery tip moves, is effected by a drive system 88, such as a mechanical drive system such as an industrial robot.

The operation of mold-filling system 51 is controlled by a programmable logic computer (PLC) 90, such industrial robot, or other drive system. PLC 90 is programmed to issue commands to resin pump 68 as to the pumping rate or pressure level in reservoir 66, to resin valve 86 regarding the degree of opening and/or closing of the valve. The resin pump can be a positive-displacement pump whereby the PLC can specify the number of pump rotations which provide the desired quantity of resin. PLC 90 can also communicate with drive system 88 regarding the path to be traversed by the delivery system assembly so as to cause delivery tip 84 to traverse the desired path in a mold. PLC 90 may optionally control the locating of mold 34 under delivery tip 84 so as to coordinate the relative positioning of the mold relative to the delivery tip. PLC 90 also issues commands to traction feed device 56 in order to control the quantity and rate of delivery of fiberglass rovings to the delivery system assembly. The traction feed device may be driven by a stepper motor or a servo motor whereby the number or incremental advances of the motor can be used to control the quantity of fiber delivered to the jet head.

With the PLC thus in control of the rate at which resin and fiber are fed to the delivery system assembly, and in control of movement of the drive system and optionally the location of the mold, the PLC thus controls delivery of the fiber and resin into the mold, by the delivery tip, along the predetermined path.

In the alternative, the amount of resin and fiberglass delivered to a mold may be calibrated by measuring the quantity of resin and fiber which is delivered during a set period of running time. The quantity of fiber is adjusted by the PLC adjusting the drive rate at the traction feed device. The quantity of resin is adjusted by manually adjusting the flow rate at resin valve 86. Once the feed rates have been calibrated for both the fiber and the resin for the set period of time, the mold fill cycle is controlled by the PLC controlling the length of time during which fiber and resin are being introduced into the mold.

Traction feed device 56 includes a first relatively larger wheel 57a and a second relatively smaller wheel 57b, both mounted to housing 74. Fiberglass roving 52 enters traction feed device 56 at wheel 57a, and passes about 180 degrees about wheel 57a, and thence moves to wheel 57b. The roving passes about 270 degrees about wheel 57b and thence travels back to wheel 57a and again traverses about 180 degrees about wheel 57a, including about 90 degrees of traverse on wheel 57a in common with the incoming roving. After the second pass about wheel 57a, the roving travels along a loose loop to the inlet end of texturizing jet head 76.

Jet head 76 is also known in the art as a nozzle. A suitable such nozzle/jet head can be assembled from a jet cage with cutting device, a jet casing, a jet needle, and a jet venturi, all available from American Dietze+Schell, Simesonville, N.C.

Such jet head assembly includes a pneumatic cylinder which engages the fiber upstream from the exit from the jet head. Such pneumatic cylinder is activated by a discrete output within the PLC program and thereby holds the fiber in place while the mechanical drive system moves the delivery system assembly to its next point of mold filling so the fiber doesn't get pulled out of the jet head prematurely. Namely, any time the PLC is not commanding that the delivery tip be in a mold cavity filling the mold, the pneumatic cylinder is engaged against the fiber to keep fiber from leaving the jet head.

Referring now to FIGS. 10-13, first and second molds, mounted on a common base plate 40, are positioned generally under the delivery system assembly such that the delivery tip is generally above a fiber-receiving cavity in the mold. Such mold may be positioned by the PLC driving a conveyor 92 so as to position the mold under the delivery tip, or may be manually positioned under the delivery tip. The position of the mold may be detected by any known sensor, such as a sensor 94, illustrated in FIG. 6. With the mold in position, the PLC commands drive system 88 to begin moving the delivery system assembly, and thus the delivery tip such that the delivery tip descends into the mold and begins moving along the predetermined path programmed into the computer. At the same time, the PLC commands the resin pump and the traction feed device to begin feeding resin and fiber to the delivery system assembly, thus to the delivery tip at the predetermined rates, as well as to deliver any programmed-in commands to the resin valve. The command connections between the PLC and the various mold-filling system elements are illustrated by dashed lines 96 in FIG. 7.

As the fiberglass roving passes through jet head 76, the jet head aerates the roving so as to cause a fluffing of the roving such that the roving exits the jet head, and thus the wand, and enters the mold, at a substantially reduced density relative to the density of the roving on spool 54. Accordingly, the fluffing of the roving means that, as the roving exits wand 78, the density of the roving has been reduced such that the overall amount of space occupied by the roving has been expanded, whereby the continuous-length fluffed fiberglass roving is substantially lighter in density per unit volume than the density per unit volume of the roving on spool 54.

As illustrated by the droplets 98 shown in FIG. 10, the resin is fed drop-wise from the exit end of conduit 70 at delivery tip 84 simultaneously with the feeding of the fluffed fiberglass through delivery tip 84, the roving being fed from conduit 78 at a first delivery tip opening, and the resin being fed from conduit 70 at a second delivery tip opening. Thus, the resin, when exiting delivery tip 84, has not yet been joined with the continuous-length fluffed fiberglass roving. The individual droplets 98 illustrated in FIG. 10 thus are first exposed to the air movement from the jet head 76 after the droplets reach the respective opening in delivery tip 84 at the end of conduit 70, and are joined with the fiberglass roving after being dispensed from the delivery tip.

The spacing between droplets 98 illustrates that the quantity of resin added to the mold is substantially less than an amount of resin which would be needed to saturate the quantity of fiberglass being added to the mold. Those skilled in the art know that the purpose of the resin in a fiberglass muffler core is limited maintaining the general configuration/shape of the insert core until the respective core is assembled into the muffler shell, and the muffler is subsequently assembled into the vehicle exhaust system. Thus, the muffler core as fabricated in the mold, and as subsequently cured, is a generally light-weight product, containing relatively little resin and substantial void volume which enables flow of exhaust gases through the fiberglass matrix while the resin is still present and before the resin is burned off by the heat of the exhaust gases. Accordingly, the rate of resin addition is limited to about that amount of resin, allowing for manufacturing variations, which is required to hold/maintain the shape of the fiber-resin composite insert core until such time as the core is assembled to a muffler shell and an engine exhaust.

As the fiberglass and resin are being fed separately from delivery tip 84, drive system 88 is moving the delivery system assembly, and thus delivery tip 84, along the predetermined path inside the mold, whereby fiber and resin are being delivered to the mold along the predetermined path. By thus controlling the delivery path, and the rate of delivery of the fiber and resin inside the mold, the density of the fiber-resin combination inside the mold can be controlled so as to deliver a relatively consistent density of fiber and resin to all portions of the mold volume.

Figure 11:
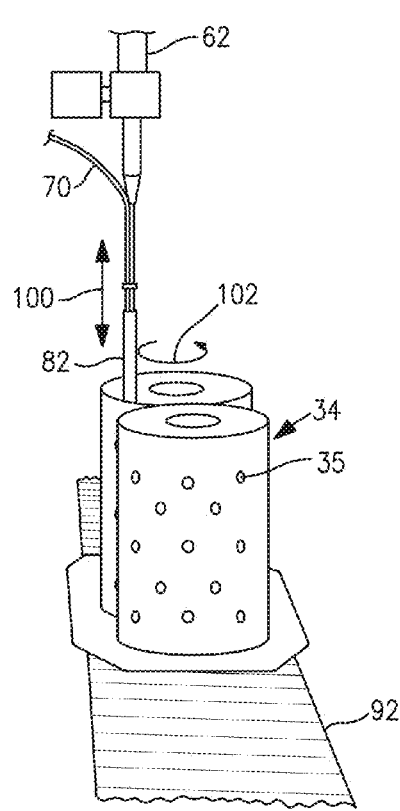
FIG. 11 is a side pictorial view showing a wand extending from the jet head, and the wand extending into the mold and the lower end of the wand at a lower level in the mold, placing fiberglass and resin at such lower level in the mold.

The movement of the delivery tip illustrated in FIG. 11 illustrates the movement of the delivery tip during the first phase of delivery of fiber and resin into the mold. In the movement illustrated in FIG. 11, the delivery tip extends to a location near the bottom of the mold. Up-down arrow 100 indicates that delivery tip 84 moves vertically up and down in the mold, with such up and down movement being confined to a lower portion of the mold, such as to the lower ⅓ of the height of the mold.

Curvilinear arrow 102 indicates that, as delivery tip 84 is moving in such up-down motion, the delivery tip is also moving transversely along a path defined both horizontally and vertically inside the mold volume, thus about the circumferential outline of the mold cavity between inner and outer walls 36, 38. The actual definition of the transverse portion of the path depends on the profile of the cavity between walls 36, 38. Where the mold cavity is relatively narrow and circular as in the mold illustrated in FIG. 3, the transverse portion of the path traveled by delivery tip 84 may be generally circular, all the while the delivery tip is travelling an up-down path as the delivery tip circumscribes the circular portion of the path about the circumference of the mold cavity.

Where the mold cavity has relatively greater dimensions between the inner and outer walls, or where the mold cavity has narrower and broader passages about the perimeter of the mold cavity as in FIG. 6, or where more than one inner wall 36 extends through the mold cavity, the delivery tip moves along a transverse portion of the path which, from time-to-time, extends with a radial component, as well as a circumferential component, in order to deliver a relatively consistent density of fiber and resin to all areas of the lower level of the mold.

Figure 12:
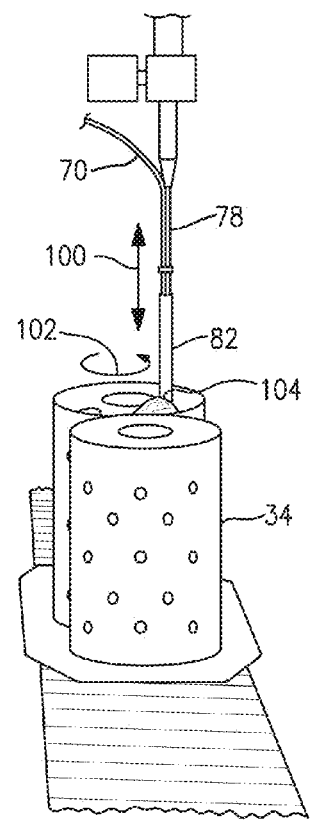
FIG. 12 is a side pictorial view as in FIG. 11, with the jet head raised such that the lower end of the wand is placing fiberglass and binder at an intermediate height in the mold.

The movement of the delivery tip illustrated in FIG. 12 illustrates the movement of the delivery tip during a second phase of delivery of fiber and resin into the mold. The movement illustrated in FIG. 12 is commenced after completion of the movement contemplated in FIG. 11 in the lower portion of the mold. In the movement illustrated in FIG. 12, the delivery tip extends to a location near the middle of the top-to-bottom height of the mold. Up-down arrow 100 again indicates that delivery tip 84 moves vertically up and down in the mold. In this second phase of delivery of fiber and resin into the mold, such up and down movement is confined to a mid-height portion of the mold, such as to the middle ⅓ of the height of the mold. The difference in height of the delivery tip can be seen conceptually by comparing the length of sleeve 82 which is visible in FIG. 12 to the length of sleeve 82 which is visible in FIG. 11. Given that the same sleeve is being used in both of FIGS. 11 and 12, given that a greater portion of the length of the sleeve is visible in FIG. 12, the delivery tip is at a higher elevation in the mold in FIG. 12 than in FIG. 11.

Again, curvilinear arrow 102 indicates that, as delivery tip 84 is moving in such up-down motion in this second phase of delivering fiber and resin to the mold, the delivery tip is also moving transversely about the horizontally-defined profile of the mold volume, thus three-dimensional motion about the circumferential outline of the mold cavity between inner and outer walls 36, 38. The actual definition of the transverse component of the path depends on the profile of the cavity between walls 36, 38. Where the mold cavity is relatively narrow and circular as in the mold illustrated in FIG. 3, the transverse component of the path traveled by delivery tip 84 may be generally circular, all while the delivery tip is travelling an up-down path as the delivery tip circumscribes the circular component path about the circumference of the mold cavity.

Where the mold cavity has relatively greater dimensions between the inner and outer walls, or where the mold cavity has narrower and broader passages about the perimeter of the mold cavity, or where more than one inner wall 36 extends through the mold cavity, the delivery tip moves along a transverse component of the path which from time-to-time, extends with a radial component as well as a circumferential component, in order to deliver a relatively consistent density and distribution of fiber and resin to all areas of the mid-height level of the mold.

FIG. 12 also suggests the fluffy nature of the fiber exiting wand 78, as a length of fiber fluff 104 extending from the top of the mold. It will be understood that the air passing through jet head 76 to fluff and drive the fiber, exits the delivery system assembly at the exit end of wand 78. Accordingly, a certain volume of air enters the mold with the fiber. That air volume exits the mold both through the top of the mold and through mold steam release ports 35 in the mold side walls and bottom wall. While the movement of the air fluffs the fiber and drives the fiber into the mold, that air is typically turbulent whereby the fiber entering the mold through wand 78 has turbulent movement characteristics, such that the fiber moves in somewhat-controlled, but random, directions. Accordingly, the PLC is programmed to deliver the fiber-resin combination, in the first phase, close to the bottom of the mold, whereby the movement of the fiber is somewhat controlled by direct contact with the bottom wall of the mold. In the second phase, the fiber is delivered close to the top of the fiber which was delivered in the first phase, whereby movement of the fiber being delivered in the second phase is somewhat controlled by direct contact with the fiber which was delivered in the first-phase of the mold filling.

Figure 13:
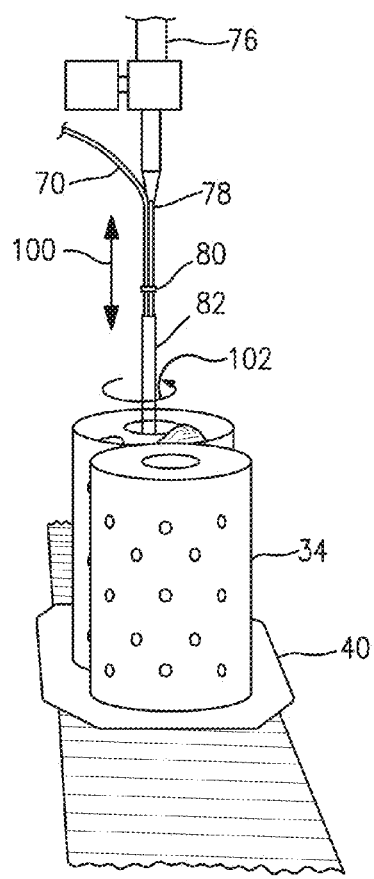
FIG. 13 is a side pictorial view as in FIGS. 11 and 12, with the jet head raised further such that the lower end of the wand is placing fiberglass and binder at a relatively upper height in the mold.

The movement of the delivery tip illustrated in FIG. 13 illustrates the movement of the delivery tip during a third phase of delivery of fiber and resin into the mold. The movement illustrated in FIG. 13 is commenced after completion of the movement contemplated in FIG. 12 in the mid-height portion of the mold. In the movement illustrated in FIG. 13, the delivery tip extends to a location near the top of the top-to-bottom height of the mold. Up-down arrow 100 again indicates that delivery tip 84 moves vertically up and down in the mold. In this third phase of delivery of fiber and resin into the mold, such up and down movement is confined to an upper portion of the mold, such as to the upper ⅓ of the height of the mold. The difference in height of the delivery tip can be seen conceptually by comparing the length of sleeve 82 which is visible in FIG. 13 to the length of sleeve 82 which is visible in FIG. 12. Given that the same sleeve is being used in both of FIGS. 12 and 13, given that a greater portion of the length of the sleeve is visible in FIG. 13, the delivery tip is at a higher elevation in the mold in FIG. 13 than in FIG. 12.

Again, curvilinear arrow 102 indicates that, as delivery tip 84 is moving in such up-down motion in this third phase of delivering fiber and resin to the mold, the delivery tip is also moving transversely about the horizontally-defined profile of the mold volume, thus three-dimensional motion about the circumferential outline of the mold cavity between inner and outer walls 36, 38. The actual definition of the transverse component of the path depends on the profile of the cavity between walls 36, 38. Where the mold cavity is relatively narrow and circular as in the mold illustrated in FIG. 3, the transverse component of the path traveled by delivery tip 84 may be generally circular, all while the delivery tip is travelling an up-down path as the tip circumscribes the circular component of the path about the circumference of the mold cavity.

Where, by contrast, the mold cavity has relatively greater dimensions between the inner and outer walls, or where the mold cavity has narrower and broader passages about the perimeter of the mold cavity, or where more than one inner wall 36 extends through the mold cavity, the delivery tip moves along a transverse portion of the path which, from time-to-time, extends with a radial component, as well as circumferential component, in order to deliver a relatively consistent density of fiber and resin to all areas of the upper portion of the mold cavity.

FIG. 13 further suggests the fluffy nature of the fiber exiting wand 78, as multiple lengths of fiber fluff 104 extend from the top of the mold.

Figure 14:
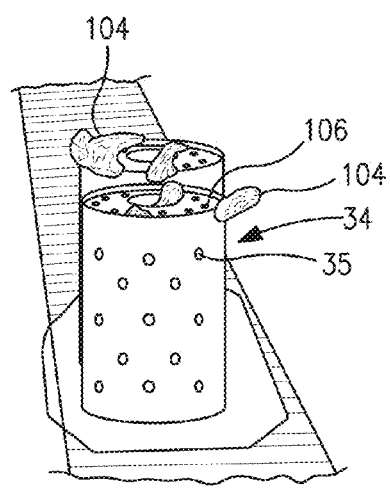
FIG. 14 shows first and second insert molds after the molds have been filled with a specified quantity of fiberglass and resin, and after mold caps have been placed over the fiberglass/resin combination, at the tops of the molds.

FIG. 14 shows both molds after the desired quantity of fiber and resin have been placed in the molds and caps 106 have been placed in the top portions of the molds. Fiber fluff 104 is seen extending from the tops of the filled molds. FIG. 14 also shows that steam release ports extend through both the sidewalls and caps of the molds. In addition, steam release ports extend through the bottom walls of the mold base plates 40 under the mold cavities.

While three levels, elevations of movement of the delivery tip, in three phases of delivering fiber and resin into the mold cavity, have been illustrated, fewer than three levels of movement, or more than three levels of movement are contemplated. The number of levels of movement is driven at least in part by the overall height "H" of the mold, and may also be driven by the level of precision needed in the consistency of density and distribution of the fiber and resin throughout the insert cores.

A significant benefit of the invention is that the relatively small cross-section of the delivery tip allows the insertion of the delivery tip into portions of the mold cavity which have rather limited cross-sections. In the illustrated embodiments, wand 78 may have a maximum cross-section outer dimension of e.g. about 0.5 inch to about 0.75 inch. And resin conduit 70 is even smaller in cross-section. Accordingly, and given the precision of transverse placement of delivery tip 84 relative to the underlying mold cavity which is available using position sensors for positioning both the mold and the wand, the delivery tip can be inserted into the mold cavity between inner and outer walls 36, 38 which are no more than 1 inch apart or less. Given that jet head 76 delivers the fiberglass roving to the delivery tip as a fluffed fibrous product, the cross-section dimension/diameter of the fluffed product after it exits wand 78 can be substantially greater than the outer diameter of the wand. Thus, a wand having an outer diameter at delivery tip of 0.5 inch, and an inside diameter of e.g. 0.42 inch, can deliver a fluffed fiber product having a cross-section nominally equivalent to a diameter of 0.5 inch or more.

Once the user determines the general cross-section of the fluffed fiber leaving the delivery tip, the user can determine the desired transverse positions, movement, of the delivery tip along the delivery tip path in order to provide a substantially uniformly-distributed packing of the fiber and resin combination the core being fabricated in the mold.

As suggested above, in the process of delivering fiber to the mold cavity, the delivery tip performs a continuous transverse and up-and-down motion, thus traversing a zig-zag path wherein the delivery tip travels transversely during each up and/or down movement.

Figure 15:
FIG. 15 is a photo copy of a side elevation view of a substantial portion of a muffler core of the invention after the core has been enclosed in a shrink film, the photo copy showing the wave-like, undulating pattern in the contained fiber.

As a result, the fiber is deposited in the mold cavity as a fluffed/expanded rope/roving in a pattern which leaves a wave-like, undulating appearance in the finished product, as illustrated in FIG. 15, the wave-like appearance optionally including a pattern which include turbulence in the formation and/or appearance of the pattern. However, as also seen in FIG. 15, since the fiber is simultaneously experiencing the turbulent movement of air through and out of wand 78, the fluffed fiber does deviate from the predominant wave-like pattern.

Thus, a visual representation of the product, once removed from the mold after curing, shows a combination of the predominant wave-like elements as well as more-circular and other non-wave-like, non-undulating, directional components.

Wand 78 can, in the alternative, be programmed to perform its transverse movements and its vertical movements independently such that the transverse movements and the vertical movements are executed independent of each other in time. Further, the magnitudes of the vertical component relative to the transverse component can be modified such that one of such components is more dominant than the other. Where the vertical, up-down component becomes more dominant, the wave-like pattern becomes more columnar, namely the height/width ratio of the waves is greater. Where the transverse component becomes more dominant, the height of the wave-like pattern decreases and the pattern becomes relatively flatter in appearance.

The invention can be used to fill mold cavities which contain multiple exhaust gas-carrying pipes because the PLC can be programmed at will regarding the predetermined path; and the user can pre-determine the desired path.

The invention, can be used to fill mold cavities where there is a partial-height barrier between cavity portions. Wand 78 is e.g. 0.5 inch outside diameter, 0.42 inch inside diameter. A larger outside diameter limits the ability to insert the delivery tip into small spaces in the mold cavity, thus limits the ability to provide consistent density and distribution of the fiber. Smaller outside diameter interferes with the ability to provide appropriate fluffing to the fiber roving. Because of the relatively small outside diameter of the exit end of wand 78, delivery tip, and the versatility to program the PLC regarding transverse movement of the delivery tip, the system of the invention can be used to fill mold cavities which have severe cross-section variations between cavity portions, delivering proportionately consistent density and distribution of the fiber-resin mixture to both more restricted cross-section portions, and less restricted cross-section portions, of the mold cavity.

Once the mold has been filled and cap 106 has been put on the mold, the mold is passed through a curing oven 110, where the binder is heated to cure the binder, which sets, and thereby establishes, a fixed shape of the resultant fiberglass-binder mixture.

The setting/curing of the binder stabilizes the collective configurations of the fiberglass strands in the wave-like, undulating configuration of mold cavity 42, such that the resulting muffler insert core is shape-constant, shape-stable, though somewhat deformable, whereby the resulting cured/set fiberglass-binder core 108 can be manually handled without necessarily jeopardizing the shape/configuration of the cured product. It is this stabilizing of the fiberglass product, in combination with uniform distribution of the fiberglass in the product, which is critical to being able to ensure that the fiberglass fills substantially the entirety of the cavity in the muffler when the binder burns off under the influence of exhaust gases from the vehicle engine.

After curing the binder by exposing the molds to the e.g. 600 degrees F. heat in the oven, the so heated molds are allowed to cool to working temperature such that the molds can be handled safely without risk of a worker being burned. The resultant insert core is then removed from the mold at a de-mold station 112 and forms the core of the finished muffler insert.

The resulting shape-constant insert core product may have residual fiberglass strands extending from e.g. the top of the core, the top of the core being defined consistent with the top of the mold. Once the cured core 108 has been removed from the mold, any such excess fiberglass material, now stiffened by the cured binder, can be removed using a cut-off saw. The cut-off process can also be used to trim the product to the specified length, if necessary.

Once the excess material has been cut off, including conforming the product to the specified length, the resulting cured fiberglass-binder product core 108 generally represents the size, shape, and the overall configuration of the fiberglass-based insert product which is desired, for insertion into a cavity inside a muffler shell.

Whatever the nature and/or structure of the cured, shape-constant core, the next stage in fabrication of the insert is to shrink wrap the core in plastic film at a shrink-wrap station 114 to create the finished muffler insert. A wide variety of single and multiple layer shrink films are suitable for such shrink wrapping. The intended function of the shrink film is generally to temporarily package the core until the insert is assembled into a muffler shell. Thus, the finished insert is subjected to only limited handling before the role of the shrink film has been completely satisfied. Accordingly, the shrink film can be selected from films which have limited abuse tolerances, which generally applies to films which are relatively lower in cost.

In general a polyethylene shrink film, one mil thick, is suitable for use as the shrink wrapping film.

In the resultant product, the shrunk plastic film overlies the fiberglass-binder core, providing a plastic-wrapped insert which fits closely inside the inner dimensions of the shell of the muffler, and closely about/outside of any tubes inside the outer shell of the muffler.

The resulting shrink-wrapped product is generally rigid, though somewhat pliable, deformable, and so is able to be conformed to slight irregularities in the inlet exhaust pipe coming from the engine, or slight irregularities in the inner surface of the outer shell of the muffler. The plastic film surrounds the outer circumference of the contained fiber-binder core and generally wraps around the ends of the core, so as to present generally smooth plastic surfaces to the inner surface of the muffler shell, as well as to any end plates or transition portions of the muffler shell.

When the insert, as part of the fully-assembled muffler, is initially exposed to the hot exhaust gases of a vehicle engine for an extended length of time, such as an hour or so, the plastic shrink film burns off. The binder burns off at sustained temperatures of e.g. at least 600 degrees F. The rate and temperature of binder burn-off varies with selections of different binders. In any event, both the plastic and the binder will ultimately burn off. Once the binder and plastic film have burned off, all that remains is the continuous-length fiberglass strands.

The process by which the insert has been fabricated, and loaded into the muffler, in the invention, results in superior uniformity of density and distribution in the fiberglass which remains inside the muffler shell after the binder and plastic have burned off. Such uniformity of density and distribution contributes to efficient sound attenuation as well as to uniformity of temperature distribution inside the muffler and about the muffler shell.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A method of charging a mold cavity, in a mold, with a combination of a fiberglass and a liquid resin, to make a generally fixed-shape fiber-resin composite muffler insert core, the mold cavity having a bottom and a top, the method comprising:
   (a) conveying a continuous-length fiberglass roving from a roving source to a jet head;
   (b) fluffing the continuous-length fiberglass roving in the jet head and urging the continuous-length fluffed fiberglass roving out an exit end of said jet head, to a delivery tip in combination with jet head air movement at the delivery tip;
   (c) conveying both the continuous-length fluffed fiberglass roving and the liquid resin to the delivery tip; and
   (d) dispensing, from the delivery tip, and into the mold cavity, both the continuous-length fluffed fiberglass roving and the liquid resin, until the mold is filled to the top of the mold cavity.

2. A method as in claim 1, comprising dispensing a given portion of the liquid resin from the delivery tip before the respective portion of the liquid resin reaches the continuous-length fluffed fiberglass roving.

3. A method as in claim 1, further comprising, in a first stage of dispensing the fiberglass and the resin into the mold cavity, confining location of the delivery tip, in the mold cavity, to a first portion of the mold cavity which is closer to the bottom of the mold cavity than to the top of the mold cavity.

4. A method as in claim 3, further comprising, in a second stage of dispensing the continuous-length fluffed fiberglass roving and the resin into the mold cavity, confining location of the delivery tip to a second portion of the mold cavity, above the first portion of the mold cavity.

5. A method as in claim 1, further comprising avoiding subjecting a given portion of the liquid resin to the jet head air movement until the given portion of the liquid resin has reached the delivery tip.

6. A method as in claim 1, further comprising using a programmable computer to instruct a mechanical drive system to move the delivery tip along a predetermined path in delivering the roving and resin into the mold cavity.

7. A method as in claim 6, further comprising the mechanical drive system moving the delivery tip along such delivery path wherein at least a portion of the path includes both a vertical vector and a horizontal vector.

8. A method as in claim 1, comprising conveying the continuous-length fluffed fiberglass roving to the delivery tip along a first conduit, and conveying the liquid resin to the delivery tip along a second conduit, distinct from the first conduit.

9. A method as in claim 1, comprising expressing the liquid resin as droplets, each separated from the delivery tip before the respective droplet joins the continuous-length fluffed fiberglass roving.

10. A method as in claim 9 wherein the liquid resin leaves the delivery tip as a series of individual droplets, formed one at a time, in sequence.

11. A method as in claim 1, including expressing the continuous-length fluffed roving and the liquid resin from the delivery tip through first and second different dispensing openings at the delivery tip.

12. A method as in claim 11 comprising conveying the continuous-length fluffed fiberglass roving and the liquid resin to the first and second different dispensing openings at the delivery tip through first and second different conduits.

13. A method as in claim 11 comprising securing the first and second different conduits to each other such that the first and second different openings move together along a delivery path.

14. A method as in claim 1 wherein the continuous-length fluffed roving, as delivered into the mold cavity, is substantially lighter in density than a density of such roving at the roving source.

15. A method as in claim 1, including limiting the amount of resin addition to the continuous-length fluffed fiberglass to only about that amount which is required to hold the generally-fixed shape of the resulting fiber-resin composite muffler insert core until such time as the fiber-resin composite insert core is assembled to a muffler shell, and to an engine exhaust, thereby to create a said muffler insert core having a substantial void volume.

16. A method as in claim 1, including using a programmable computer to control
 (i) conveying the continuous-length fiberglass roving from the roving source to the jet head,
 (ii) fluffing the continuous-length fiberglass roving in the jet head,
 (iii) conveying the continuous-length fluffed fiberglass roving, and the resin, to the delivery tip, and
 (iv) delivering the continuous-length fluffed fiberglass roving, and the resin, into the mold cavity.

17. A method as in claim 1, further comprising, after the mold is filled, applying a cap to the mold.

18. A method of charging a mold cavity, in a mold, with a combination of a fiberglass and a liquid resin to make a generally fixed-shape fiber-resin composite muffler insert core, the mold cavity having a bottom and a top, the method comprising:
 (a) conveying a continuous-length fiberglass roving from a roving source to a jet head;
 (b) fluffing the continuous-length fiberglass roving in the jet head, with jet head air movement, and urging the fluffed continuous-length fiberglass roving out an exit end of said jet-head, to a delivery tip;
 (c) conveying both the continuous-length fluffed fiberglass roving and the liquid resin to the delivery tip;
 (d) inserting the delivery tip into the mold cavity, and dispensing both the continuous-length fluffed fiberglass roving and the liquid resin, from the delivery tip, into the mold cavity, and
 (e) in a first stage of the dispensing of both the continuous-length fluffed fiberglass roving and the liquid resin into the mold cavity, confining location of the delivery tip, in the mold cavity, to a first portion, less than an entirety, of a height of the mold cavity.

19. A method as in claim 18, comprising confining location of the delivery tip to a portion of the mold cavity which is closer to the bottom of the mold cavity than to the top of the mold cavity.

20. A method as in claim 19, further comprising, in a subsequent second stage of the dispensing of both the continuous-length fluffed fiberglass roving and the liquid resin into the mold cavity, confining location of the delivery tip to a second portion of the mold cavity above the first portion of the mold cavity.

21. A method as in claim 18 comprising dispensing a given portion of the liquid resin from the delivery tip before the respective portion of the liquid resin reaches the continuous-length fluffed fiberglass roving.

22. A method as in claim 18, further comprising using a programmable computer to instruct a mechanical delivery system to confine location of the delivery tip to a portion of the mold cavity closer to the bottom of the mold cavity than to the top of the mold cavity.

23. A method as in claim 18, further comprising avoiding subjecting a given portion of the liquid resin to the jet head air movement until the given portion of the liquid resin has reached the delivery tip.

24. A method as in claim 18, comprising conveying the continuous-length fluffed fiberglass roving to the delivery tip through a first conduit, and conveying the liquid resin to the delivery tip through a second conduit, distinct from the first conduit.

25. A method as in claim 24 wherein the liquid resin leaves the delivery tip as a series of individual droplets, formed one at a time, in sequence, each following a predecessor such droplet along a generally common downward direction.

26. A method as in claim 25 comprising conveying the continuous-length fluffed fiberglass roving and the liquid resin to the first and second different openings at the delivery tip through respective first and second different conduits.

27. A method as in claim 26 comprising securing the first and second different conduits to each other such that the first and second different openings move together along a delivery path.

28. A method as in claim 18, comprising expressing the liquid resin as droplets, each expressed from the delivery tip before the respective droplet joins the continuous-length fluffed fiberglass roving.

29. A method as in claim 18, including expressing the continuous-length fluffed fiberglass roving and the liquid resin from the delivery tip through first and second different dispensing openings at the delivery tip.

30. A method as in claim 18, including using a programmable computer to control
   (i) conveying the continuous-length fiberglass roving from the roving source to the jet head,
   (ii) fluffing the continuous-length fiberglass roving in the jet head,
   (iii) conveying the continuous-length fluffed fiberglass roving, and the resin, to the delivery tip, and
   (iv) delivering the continuous-length fluffed fiberglass roving, and the resin, into the mold cavity.

31. A method of charging a mold cavity, in a mold, with a combination of a fiberglass and a liquid resin to make a generally fixed-shape fiber-resin composite muffler insert core, the mold cavity having a bottom and a top, the method comprising:
   (a) conveying a continuous-length fiberglass roving from a roving source to a jet head;
   (b) fluffing the continuous-length fiberglass roving in the jet head and urging the continuous-length fluffed fiberglass roving out an exit end of the jet head, to a delivery tip in combination with jet head air movement at the delivery tip;
   (c) conveying both the continuous-length fluffed fiberglass roving and the liquid resin to the delivery tip; and
   (d) dispensing, from the delivery tip, and into the mold cavity, both the continuous-length fluffed fiberglass roving and the liquid resin, including expressing a given portion of the liquid resin from the delivery tip before the given portion of the liquid resin joins the continuous-length fluffed fiberglass roving.

32. A method as in claim 31 wherein the liquid resin leaves the delivery tip as a series of individual droplets, formed one at a time, in sequence, each following a predecessor such droplet along a generally common downward direction.

33. A method as in claim 31, including expressing the continuous-length fluffed roving and the liquid resin from the delivery tip through first and second different dispensing openings at the delivery tip.

34. A method as in claim 33 comprising conveying the continuous-length fluffed fiberglass roving and the liquid resin to the first and second different dispensing openings at the delivery tip through first and second different conduits, and securing the first and second different conduits to each other such that the first and second different openings move together along a delivery path.

35. A method as in claim 31, including limiting the amount of resin addition to the continuous-length fluffed fiberglass roving to only that amount required to hold the generally-fixed shape of the resulting fiber-resin composite muffler insert core until such time as the fiber-resin composite insert core is assembled to a muffler shell, and to an engine exhaust, thereby to create a such muffler insert core having a substantial void volume.

36. A method as in claim 31, further comprising, in a first stage of dispensing the fiberglass and the resin into the mold cavity, confining location of the delivery tip to a first portion of the mold cavity which is closer to the bottom of the mold cavity than to the top of the mold cavity.

37. A method as in claim 36, further comprising, in a second stage of dispensing the fiberglass roving and the resin into the mold cavity, confining location of the delivery tip, along the predetermined path, to a second portion of the mold cavity above the first portion of the mold cavity.

38. A method of charging a mold cavity, in a mold, with a combination of a fiberglass and a liquid resin, to make a fiber-resin composite muffler insert core, the mold cavity having a bottom and a top, the method comprising:
   (a) conveying a continuous-length fiberglass roving from a roving source to a jet head;
   (b) fluffing the continuous-length fiberglass roving in the jet head and urging the fluffed continuous-length fiberglass roving out an exit end of said jet-head, to a delivery tip, with jet head air movement;
   (c) conveying both the continuous-length fluffed fiberglass roving and the liquid resin-to the delivery tip;
   (d) dispensing, from the delivery tip, and into the mold cavity, both the continuous-length fluffed fiberglass roving and the liquid resin while avoiding subjecting a given portion of the liquid resin to the jet head air movement until the respective portion of the liquid resin has reached the delivery tip.

39. A method as in claim 38 comprising conveying the continuous-length fluffed fiberglass roving to the delivery tip along a first conduit, and conveying the liquid resin to the delivery tip along a second conduit, distinct from the first conduit.

40. A method as in claim 38 wherein the liquid resin leaves the delivery tip as a series of individual droplets, formed one at a time, in sequence, each following a predecessor such droplet along a generally common downward direction.

41. A method as in claim 38, including expressing the continuous-length fluffed roving and the liquid resin from the delivery tip through first and second different dispensing openings at the delivery tip.

42. A method as in claim 41 comprising conveying the continuous-length fluffed fiberglass roving and the liquid resin to the first and second different dispensing openings at the delivery tip through first and second different conduits.

43. A method as in claim 41 comprising securing the first and second different conduits to each other such that the first and second different openings move together along a delivery path.

44. A method as in claim 38 comprising dispensing a given portion of the liquid resin from the delivery tip before the respective portion of the liquid resin reaches the continuous-length fluffed fiberglass roving.

45. A method of charging a mold cavity, in a mold, with a combination of a fiberglass and a liquid resin, to make a fiber-resin composite muffler insert core, the mold cavity having a bottom and a top, the method comprising:
   (a) conveying a continuous-length fiberglass roving from a roving source to a jet head;
   (b) fluffing the continuous-length fiberglass roving in the jet head and urging the fluffed continuous-length fiberglass roving out an exit end of said jet-head, to a delivery tip, with jet head air movement;
   (c) conveying both the continuous-length fluffed fiberglass roving and the liquid resin-to the delivery tip;
   (d) dispensing the continuous-length fluffed fiberglass roving into the mold cavity through a first delivery tip opening and dispensing the liquid resin into the mold cavity through a second delivery tip opening, distinct from the first delivery tip opening.

46. A method as in claim 45 comprising conveying the continuous-length fluffed fiberglass roving to the first delivery tip opening along a first conduit, and conveying the liquid resin to the second delivery tip opening along a second conduit, distinct from the first conduit.

47. A method as in claim 46 comprising securing the first and second conduits to each other such that the first and second delivery tip openings move together along a delivery path.

48. A method as in claim 45 wherein the liquid resin leaves the second delivery tip opening as a series of individual droplets, formed one at a time, in sequence.

49. A method as in claim 45 comprising dispensing a given portion of the liquid resin from the second delivery tip opening before the respective portion of the liquid resin reaches the continuous-length fluffed fiberglass roving.

50. A method of charging a mold cavity, in a mold, with a combination of a fiberglass and a liquid resin, to make a generally fixed-shape fiber-resin composite muffler insert core, the mold having a bottom and a top, the method comprising:
   (a) conveying a continuous-length fiberglass roving from a roving source to a jet head;
   (b) fluffing the continuous-length fiberglass roving in the jet head and urging the continuous-length fluffed fiberglass roving out an exit end of said jet head, to a delivery tip in combination with jet head air movement at the delivery tip;
   (c) conveying both the continuous-length fluffed fiberglass roving and the liquid resin to the delivery tip; and
   (d) dispensing, from the delivery tip, and into the mold cavity, both the continuous-length fluffed fiberglass roving and the liquid resin, until the dispensed roving extends above the top of the mold.

51. A method as in claim 50 comprising conveying the continuous-length fluffed fiberglass roving to the delivery tip along a first conduit, and conveying the liquid resin to the delivery tip along a second conduit, distinct from the first conduit.

52. A method as in claim 51 wherein the liquid resin leaves the delivery tip as a series of individual droplets, formed one at a time, in sequence, each following a predecessor such droplet along a generally common downward direction.

53. A method as in claim 50, including expressing the continuous-length fluffed roving and the liquid resin from the delivery tip through first and second different dispensing openings at the delivery tip.

54. A method as in claim 53 comprising conveying the continuous-length fluffed fiberglass roving and the liquid resin to the first and second different dispensing openings at the delivery tip through first and second different conduits.

55. A method as in claim 53 comprising securing the first and second different conduits to each other such that the first and second different openings move together along a delivery path.

56. A method as in claim 50 comprising dispensing a given portion of the liquid resin from the delivery tip before the respective portion of the liquid resin reaches the continuous-length fluffed fiberglass roving.

* * * * *